(12) United States Patent
Koren

(10) Patent No.: US 7,304,321 B2
(45) Date of Patent: Dec. 4, 2007

(54) METHODS AND APPARATUS FOR IMAGING ELONGATE OBJECTS

(75) Inventor: Jacob Koren, Carmelia (IL)

(73) Assignee: OREX Computed Radiography, Ltd., Yokneam (IL)

( * ) Notice: Subject to any disclaimer, the term of this patent is extended or adjusted under 35 U.S.C. 154(b) by 0 days.

(21) Appl. No.: 11/250,225

(22) Filed: Oct. 14, 2005

(65) Prior Publication Data

US 2006/0081794 A1 Apr. 20, 2006

Related U.S. Application Data

(60) Provisional application No. 60/619,261, filed on Oct. 15, 2004.

(51) Int. Cl.
*G03B 42/08* (2006.01)

(52) U.S. Cl. ...................... 250/584; 250/589

(58) Field of Classification Search ............... 250/583, 250/584, 588, 589
See application file for complete search history.

(56) References Cited

U.S. PATENT DOCUMENTS

| 3,725,703 | A | 4/1973 | Bucky |
| 3,774,045 | A | 11/1973 | Trott |
| 5,130,541 | A | 7/1992 | Kawai |
| 6,273,606 | B1 | 8/2001 | Dewaele et al. |
| 6,563,943 | B1 | 5/2003 | Sasada |
| 6,696,691 | B2 | 2/2004 | Foos et al. |
| 6,744,062 | B2 | 6/2004 | Brahm et al. |
| 6,791,101 | B2 | 9/2004 | Koren |
| 6,843,598 | B2 | 1/2005 | Minnigh et al. |
| 6,852,987 | B2 | 2/2005 | Steklenski et al. |
| 2002/0081010 | A1 | 6/2002 | Chang et al. |
| 2002/0109113 | A1* | 8/2002 | Wang et al. ............... 250/584 |
| 2002/0121612 | A1* | 9/2002 | Foos et al. ............... 250/484.4 |

FOREIGN PATENT DOCUMENTS

EP 1 312 977 5/2003

\* cited by examiner

*Primary Examiner*—Constantine Hannaher

(57) ABSTRACT

A storage phosphor cassette for use in recording radiographic images of elongated objects. The cassette comprises a shell and a single storage phosphor plate. The shell includes first and second opposite open ends. The single storage phosphor plate is housed within the shell and is adapted to be at least partially removable from the shell through the first and second open ends. A radiation image of the elongate object can be read by extracting a first portion of the single plate through one of the two opposing ends of the cassette and scanning the first portion of the single storage phosphor plate to obtain a first partial image, and then extracting a second portion of the single plate through the other of the two opposing ends of the cassette and scanning the second portion of the single storage phosphor plate to obtain a second partial image. The first and second partial images can be combined to form the image of the elongate object.

5 Claims, 9 Drawing Sheets

METHODS AND APPARATUS FOR IMAGING ELONGATE OBJECTS

CROSS REFERENCE TO RELATED APPLICATIONS

Reference is made to, and priority is claimed from, U.S. Provisional Patent Application No. 60/619,261, entitled "METHODS AND APPARATUS FOR IMAGING ELONGATE OBJECTS", filed on Oct. 15, 2004 in the name of Koren, and which is assigned to the assignee of this application and incorporated herein by reference.

FIELD OF THE INVENTION

The invention relates generally to the field of medical imaging, and in particular to imaging elongated objects More specifically, the invention relates to imaging elongated body regions, such as the full spine or the leg. A particular use for such imaging is in computed radiography (CR).

BACKGROUND OF THE INVENTION

X-ray imaging technology provides a non-invasive technique for visualizing the internal structure of an object of interest by exposing the object to high energy electromagnetic radiation (i.e., X-rays). X-rays emitted from a radiation source pass through the object and are absorbed at varying levels by the internal structures of the object. As a result, X-ray radiation exiting the object is attenuated according to the various absorption characteristics of the materials which the X-rays encounter.

The absorption characteristics of the object of interest may be captured by placing the object between a high energy electromagnetic radiation source and an image recording medium. As radiation from the source passes through the object, the radiation impinges on the image recording medium with an intensity related to the attenuation caused by the different absorption characteristics of the object. The impinging radiation causes a change in the image recording medium that is proportional to the radiation intensity, thereby storing information about the internal structure of the object. The image recording medium may then be processed to recover the stored information by, for instance, converting it into digital form. Common types of image recording media include sheet film, phosphor media, and the like.

Phosphor plate technology has emerged as a valuable image recording media for computed radiography (CR). When electromagnetic radiation, such as X-ray radiation, impinges on a phosphor plate, the radiation interacts with the phosphor lattice of the plate. The phosphors in the plate store energy proportional to the intensity of the impinging radiation. This energy can later be released by scanning the plate with a laser to excite the phosphors in the plate (i.e., by causing the phosphors to fluoresce). The excited phosphors release radiation that can be detected, quantified and stored as values representing pixels in an image.

Some imaging procedures require exposure to radiation of relatively large-dimensioned objects, referred to generally as elongate objects. Elongate objects typically have at least one dimension larger than standard large-sized commercially available phosphor plates. For example, in various medical imaging procedures, elongate structures involved in full-leg or spine examinations may need relatively long portions of the body to be imaged at once. Such procedures are often referred to as "long bone" imaging and typically require specialized equipment to accommodate the elongate properties of the anatomy being imaged. In addition, imaging of elongate objects in the industrial setting is often desirable. For example, non-destructive imaging to test for structural integrity of structural supports such as pillars or load-bearing walls and/or imaging of plumbing such as pipes may include elongate objects that extend further than the capacity of a single conventional phosphor plate.

Conventional size radiographic image acquisition units are limited in size and unsuitable for imaging elongated body regions such as the full spine or the leg. When it is necessary to obtain a radiographic image of a full spine or leg, several approaches have been used. If film/screen technology is used, either an extra long, non-standard radiographic film is used. For example, see U.S. Pat. No. 5,130,541 (Kawai). Alternatively, as disclosed in U.S. Pat. No. 3,774,045 (Trott) and U.S. Pat. No. 3,725,703 (Bucky), a cassette or cart is provided for holding a plurality of overlapping conventional sized film cassettes or packs.

A further alternative involves placing two or more standard sized CR phosphor plates (e.g., 35×43 cm phosphor plates) lengthwise adjacent to one another in a specialized cassette. The combined lengths of the multiple plates may be sufficient to image an elongate object having a dimension greater than the longest dimension of any single phosphor plate. The term "cassette" refers generally to any of various casings, cartridges or containers adapted to hold other material, and more particularly, adapted to hold one or more image recording media (e.g., one or more phosphor plates) to protect against damage from direct handling, contact or exposure. For example, a cassette may be formed as a rigid encasement providing a shell that can withstand the weight of a patient, rough handling, accidental falls, etc. A cassette typically includes some form of opening that permits insertion and extraction of the image recording media into and out of the cassette.

Cassettes employing two or more storage phosphor plates/screens have been disclosed. For example, see commonly assigned U.S. Pat. No. 6,852,987 (Steklenski), U.S. Pat. No. 6,696,691 (Foos), and U.S. Pat. No. 6,744,062 (Brahm). See also U.S. Pat. No. 6,843,598 (Minnigh), U.S. Pat. No. 6,273,606 (Dewaele), EP 1 312 977 (Delaby), JP 2000-241920 (Sasada), JP 2002-202571 (Nakajo), JP 2000-267210 (Sasada), JP 2000-250153 (Sasada), and JP 2000-258861 (Sasada).

FIG. 1 illustrates an exemplary elongate body imaging apparatus. The apparatus includes a cassette 100 having a width X and a length Y. Cassette 100 is adapted to hold a pair of phosphor plates 150a and 150b, each having a width x and a length y. In general, the length Y is chosen to accommodate a desired long bone imaging procedure, for example, an examination of an entire leg or spinal column. The length y is typically equal to the length of conventional phosphor plates produced by major vendors of imaging plates, and is insufficient, on its own, to capture complete image information for the entire elongate object.

Phosphor plates 150a and 150b are placed in cassette 100 in an overlapping relationship to form an overlap region 155 having a width u. Together, the dimensions of plates 150a and 150b (i.e., 2y-u) is sufficient to capture image information of the entire elongate object.

Cassette 100 may include reference or fiducial marks (not shown) that cast a "shadow" on portions of the plates, for example, in overlap region 155. The reference marks may be any generally X-ray resistant material arranged in a known pattern or relationship to one another that, when exposed to X-ray radiation, will cast a distinguishable shadow on the phosphor plates. For example, the reference marks may be a plurality of parallel and perpendicular lines that, when exposed, imprint a grid pattern on the phosphor plates. The reference marks provide fiducial information that may be referenced to correct for alignment errors and as a guide to facilitate image stitching, as discussed in further detail below.

The above described action of overlapping multiple plates in a cassette may be repeated to achieve coverage of elongate objects of any desired dimension. For example, a cassette may be adapted to hold a third plate having an overlapping relationship with the bottom edge of plate 150b. Any number of plates may be positioned together to arrive at a length sufficient to obtain image information from a desired elongate object.

After the cassette is exposed to radiation in the presence of the elongate object, phosphor plates 150a and 150b are removed from the cassette and are loaded individually and successively into a CR image reader adapted to acquire image information stored on the standard sized plates. Accordingly, the CR image reader obtains a first partial image from phosphor plate 150a and a second partial image from phosphor plate 150b.

However, the separate partial images make diagnostic and/or examination of the elongate object relatively difficult. Thus, the CR image reader may include image processing techniques adapted to stitch the partial images together using alignment information provided by the reference marks imprinted on the partial images to form a single image of the elongate object. Some stitching methods have been disclosed, for example, see commonly assigned U.S. Pat. No. 6,895,106 (Wang).

SUMMARY OF THE INVENTION

An object of the present invention is to provide a cassette which can be employed to image elongated objects in a single exposure.

Another object of the present invention is to provide such a storage phosphor cassette.

These objects are given only by way of illustrative example, and such objects may be exemplary of one or more embodiments of the invention. Other desirable objectives and advantages inherently achieved by the disclosed invention may occur or become apparent to those skilled in the art. The invention is defined by the appended claims.

According to one aspect of the present invention, there is provided a storage phosphor cassette for use in recording radiographic images of elongated objects. The cassette comprises a shell and a single storage phosphor plate. The shell includes first and second opposite open ends. The single storage phosphor plate is housed within the shell and is adapted to be at least partially removable from the shell through the first and second open ends.

According to another aspect of the present invention, there is provided a method of forming a composite digital image of an elongate object from a radiation image formed on a single extended length storage phosphor plate disposed within a cassette. The method includes the steps of: extracting a first portion of the single plate through a first end of the cassette; scanning the first portion to obtain a first partial image; extracting a second portion of the single plate through a second end of the cassette opposing the first end; scanning the second portion to obtain a second partial image; and combining the first and second partial images to form the image of the elongate object.

According to a further aspect of the present invention, there is provided a method of reconstructing a radiation image of an elongated object. The method comprising the steps of: extracting a first portion of a single storage phosphor plate of length L disposed within a cassette through a first end of the cassette, the first portion having a length S1 wherein S1<L; scanning the first portion to read storage information on the first portion to obtain a first partial image; erasing the stored information on a first segment of the first portion, the first segment having a length E1 wherein E1<S1; extracting a second portion of the single storage phosphor plate through a second end of the cassette, the second end opposing the first end, the second portion having a length S2 wherein S2<L and S1+S2>L; scanning the second portion to read storage information on the second portion to obtain a second partial image; and erasing the remaining stored information stored on the storage phosphor plate.

BRIEF DESCRIPTION OF THE DRAWINGS

The foregoing and other objects, features, and advantages of the invention will be apparent from the following more particular description of the embodiments of the invention, as illustrated in the accompanying drawings. The elements of the drawings are not necessarily to scale relative to each other.

DETAILED DESCRIPTION OF THE INVENTION

Figure 1:
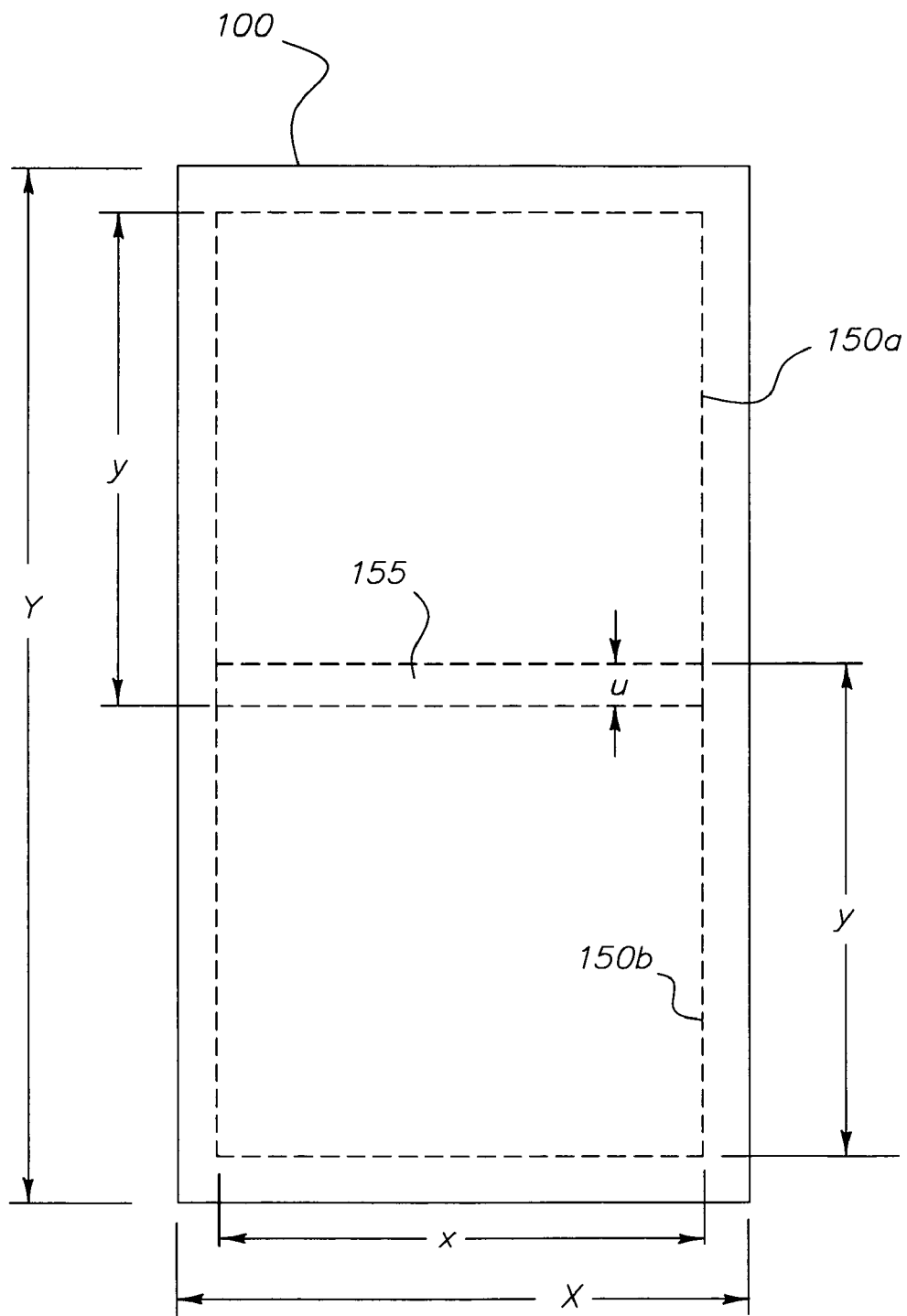
FIG. 1 shows a diagrammatic view of an exemplary elongate body imaging cassette comprising a pair of storage phosphor plates.

The following is a detailed description of the preferred embodiments of the invention, reference being made to the drawings in which the same reference numerals identify the same elements of structure in each of the several figures.

As discussed above, conventional imaging of elongate objects involves stitching together two or more partial images obtained from separate and respective phosphor plates. However, employing multiple phosphor plates complicates the imaging process. First, the cassette typically includes mechanisms to ensure that the plates are substantially aligned, both in rotation with respect to one another and in preserving a desired overlap region. Moreover, because the complete latent image is stored on separate phosphor plates, the act of scanning the individual plates introduces further alignment difficulties that typically require relatively sophisticated imaging algorithms to remedy before the partial images may be stitched together to form a viewable and faithful image of an elongate object.

A stitching algorithm may need to identify and compensate for both rotational and angular misalignment between the partial images and a range of translational misalignment in the overlap region. Moreover, images that are successfully stitched together may include, to some extent, distortion caused by the image processing employed to correct for the various alignment errors. Conventional stitching algorithms often rely on the redundant information provided in the overlap region(s) of the multiple phosphor plates. For example, since portions of plates 150a and 150b in overlap region 155 are exposed to attenuated radiation from the same parts of the object being imaged, both plates should record, to some extent, the same information in this overlap region. However, the absorption characteristics of the upper phosphor plate results in relatively faint exposure on the lower plate. This reduction in the "signal" on the lower plate reduces the correlative properties of this supposed redundant information and makes stitching relatively difficult, reducing the precision of the alignment algorithms.

Figure 2:
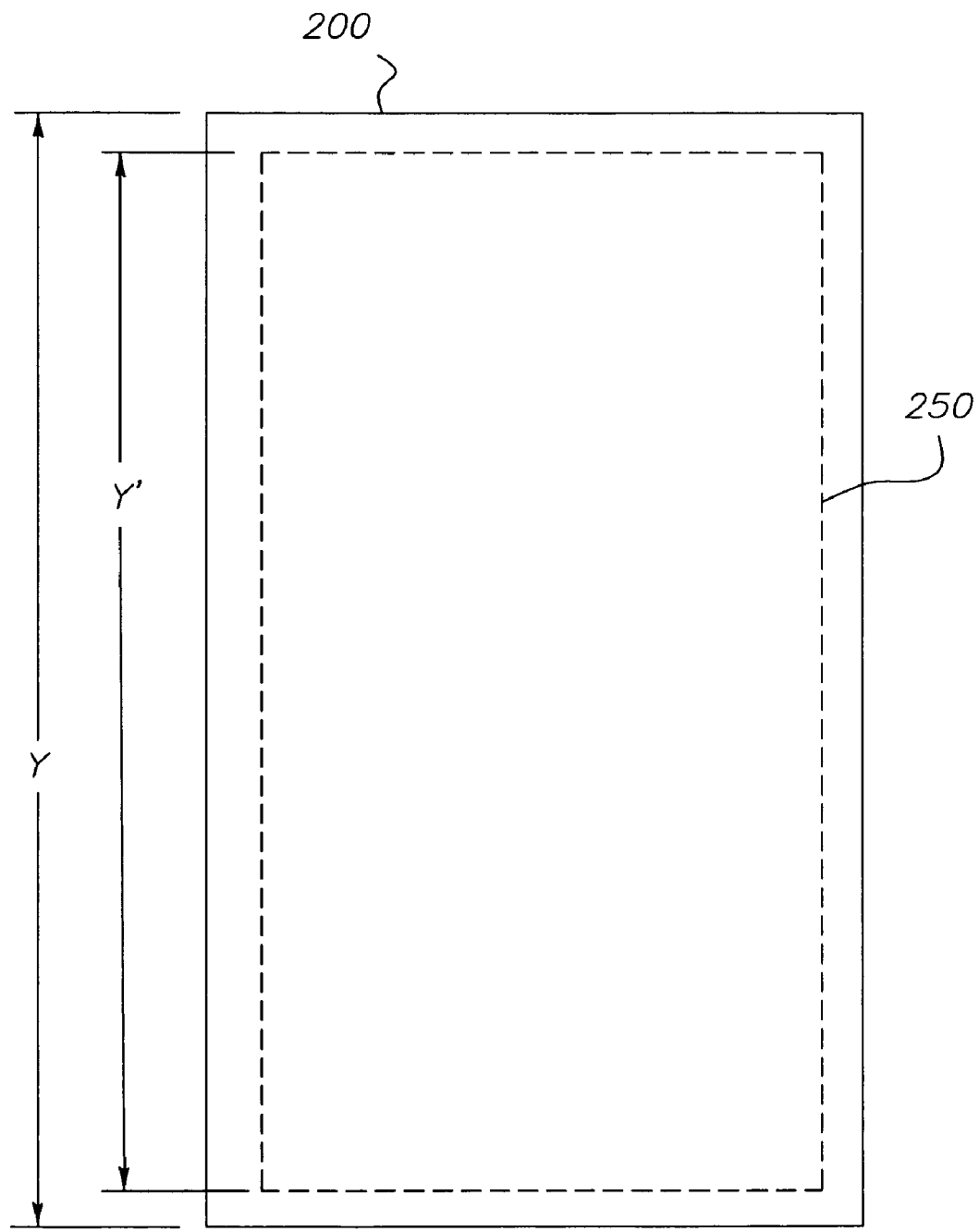
FIG. 2 shows a diagrammatic view of a radiographic imaging cassette having an extended length plate, in accordance with the present invention.

Applicant has appreciated that some of the problems associated with scanning elongate objects by employing multiple standardized phosphor plates may be alleviated or reduced by using a single extended length phosphor plate. FIG. 2 illustrates an imaging apparatus for scanning elongate objects, in accordance with one embodiment of the present invention. The imaging apparatus includes a cassette 200 dimensioned to a length capable of accommodating long bone imaging, such as a full-leg or full-spine examination. In particular, cassette 200 is provided with a length Y equal to or greater than the elongate object to be imaged. Cassette 200 is adapted to hold a single phosphor plate 250 having a length Y' sufficient to capture image information of the elongate object.

As will become more apparent with the description below, cassette 200 includes an elongate rectangular shell having two opposing ends. Plate 250 is disposed within cassette 200 such that it can be moved relative to the shell (for example, by a sliding motion) so as to be at least partially removed from either end of the cassette. As such, plate 250 can be accessed from cassette 200 through either end of the cassette by extraction of the plate from either cassette end. Accordingly, cassette 200 is a double-ended cassette comprising a single plate. When plate 250 is disposed within the shell, the cassette is preferably substantially light-tight.

It should be appreciated that the extended length plate may be manufactured to correspond to lengths conventionally achieved using any number and combination of multiple plates. For example, an extended length plate may include dimensions achieving the same coverage as two, three, four or any number of multiple plates of any combination of dimensions positioned together, as the aspects of the invention are not limited in this respect.

The introduction of a single extended length plate obviates the need to carefully arrange multiple plates in the cassette to avoid alignment errors. In particular, since no overlap region is required, the cassette need not include structure adapted to properly place and hold multiple cassettes in an overlapping relationship. In addition, because the plate is integral, errors caused by rotational misalignment during exposure are eliminated. As discussed in further detail below, single plate imaging includes further benefits during the scanning process.

In conventional long bone imaging, after multiple phosphor plates have been exposed to X-ray radiation, a first plate is extracted from the cassette and loaded into a CR image reader. An example of a CR image reader is described in U.S. Pat. No. 6,791,101 ('101) to inventor Koren, which is incorporated herein in its entirety. The CR image reader may be adapted to perform a complete scan of some predetermined maximum length, referred to as the scan length. For example, the CR image reader may be designed with a scan length of approximately 43 cm to accommodate and process standard sized phosphor plates in a single scanning procedure. The term "scan length" with reference to a CR image reader, defines the maximum length of an image recording medium that the CR image reader is capable of capturing in a single scan. In general, the scan-length is closely related to the size of the CR image reader. For example, when a phosphor plate is loaded into the CR image reader, the dimensions of the image reader can only accommodate some maximum length of plate. Many CR image readers are designed to accommodate the standard large-sized phosphor plate available on the market (e.g., a 35×45 cm phosphor plate). Such a scan-length is insufficient to acquire a long bone image in a single scanning operation.

FIGS. 3A-3D illustrate snapshots of a conventional scanning process for obtaining a long bone image from a pair of standardized medical imaging plates.

Figure 3A:
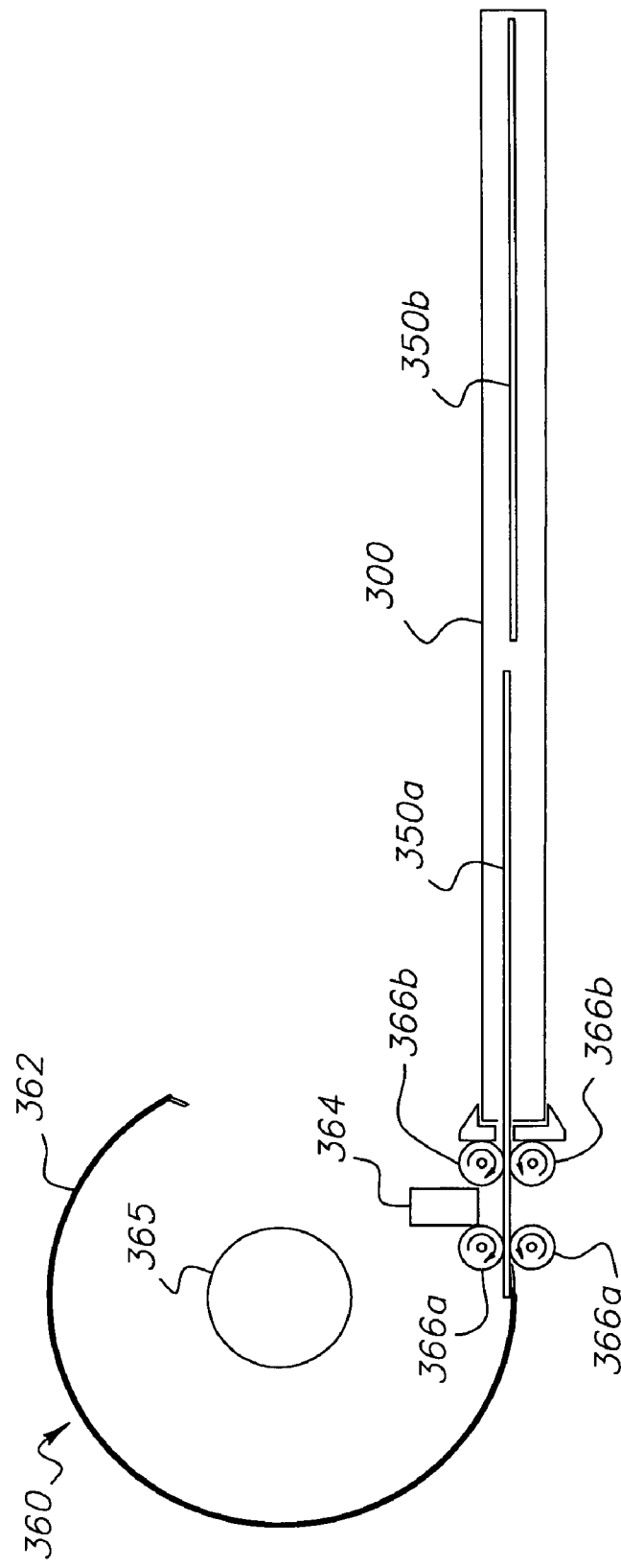
FIGS. 3A-3D illustrate diagrammatic views of a conventional scanning process for obtaining a long bone image from a pair of standardized medical imaging plates.

FIG. 3A illustrates a cassette 300 inserted into a CR image reader 360. The cassette holds a pair of standard sized plates 350a and 350b that have been exposed to radiation. First, plate 350a is extracted from cassette 300 by pinch rollers 366a and 366b and guided into cylindrical segment 362, for example, a cylindrical drum providing conformal support for the phosphor plate as it enters CR image reader 360. CR image reader also includes scanning components 365 adapted to stimulate the phosphor plate (e.g., via a laser beam) and detect stimulated radiation emitted by the phosphor plate in response to the laser beam (e.g., via a photo multiplier tube (PMT)), such as described in the '101 patent. CR image reader 360 also includes erasing lamps 364 adapted to erase information from the phosphor plates as described in further detail below.

Figure 3B:
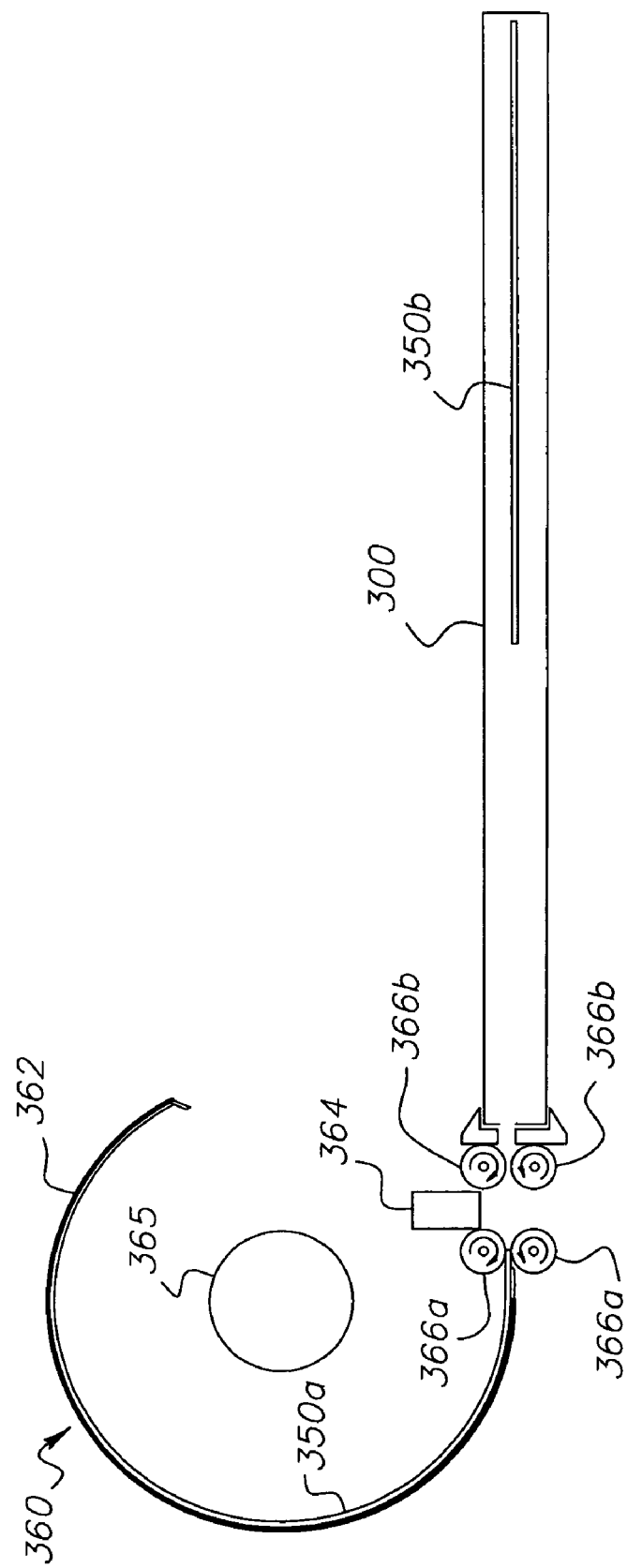

In FIG. 3B, phosphor plate 350a has been fully inserted into the image reader and is ready for scanning by scanning components 365. Scanning components 365 may include a laser source capable of providing stimulating radiation to the surface of the cylindrical segment 362 and a detector capable of detecting radiation emitted by phosphor plate 350a in response to laser energy impinging on its surface. It should be appreciated that the scan length of CR image reader 360 depends, in part, on the circumference of cylindrical segment 362 and/or on mechanical limitations of scanning components 365. After phosphor plate 350a has been scanned and a first partial image obtained, rollers 366a and 366b reverse direction to guide phosphor plate 350a back into cassette 300 as illustrated in FIG. 3C, until the plate is securely back in the cassette as shown in FIG. 3D.

To reduce the overall processing time of acquiring images from phosphor plates and returning the plate(s) to the cassette for re-use, the phosphor plates are often erased simultaneously with insertion back into the cassette. Erasing a phosphor plate may involve exposing the plate to bright light so that the phosphors in the plate release any energy remaining in the phosphor lattice plate after a scanning cycle has been completed.

Figure 3C:
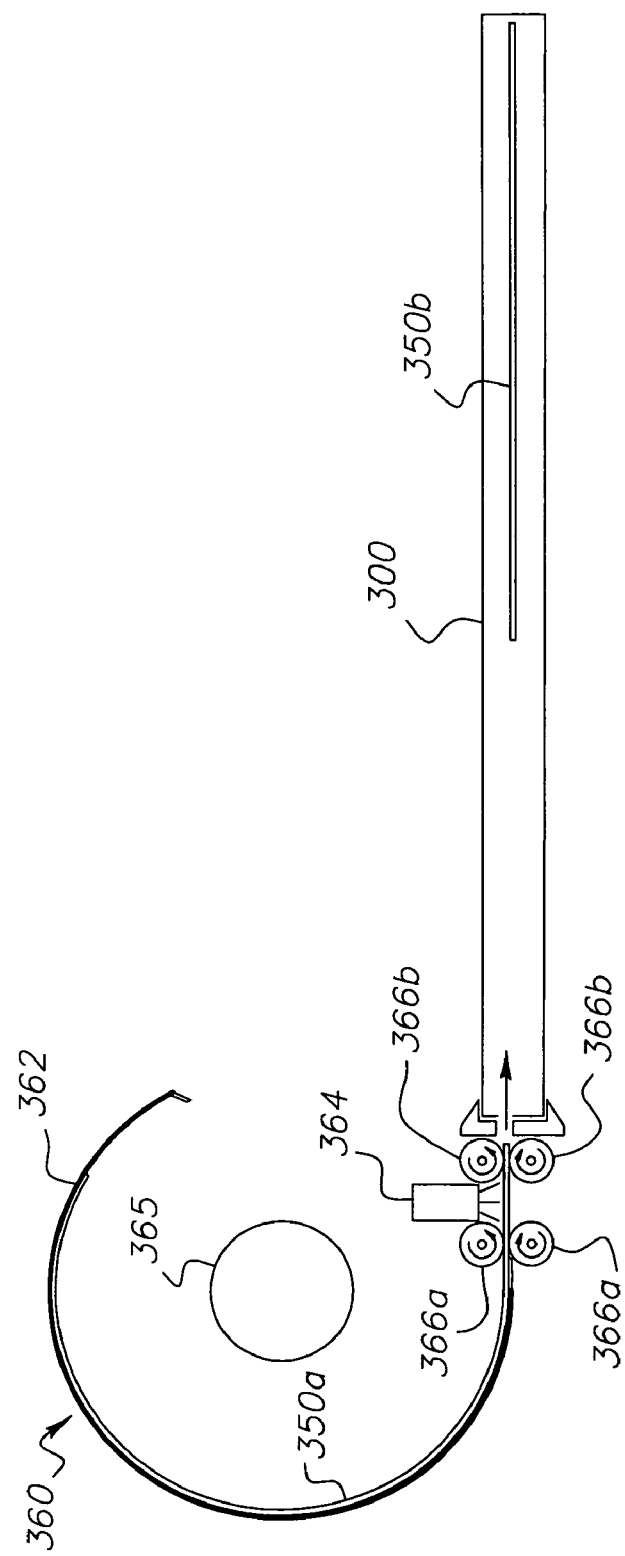
Figure 3D:
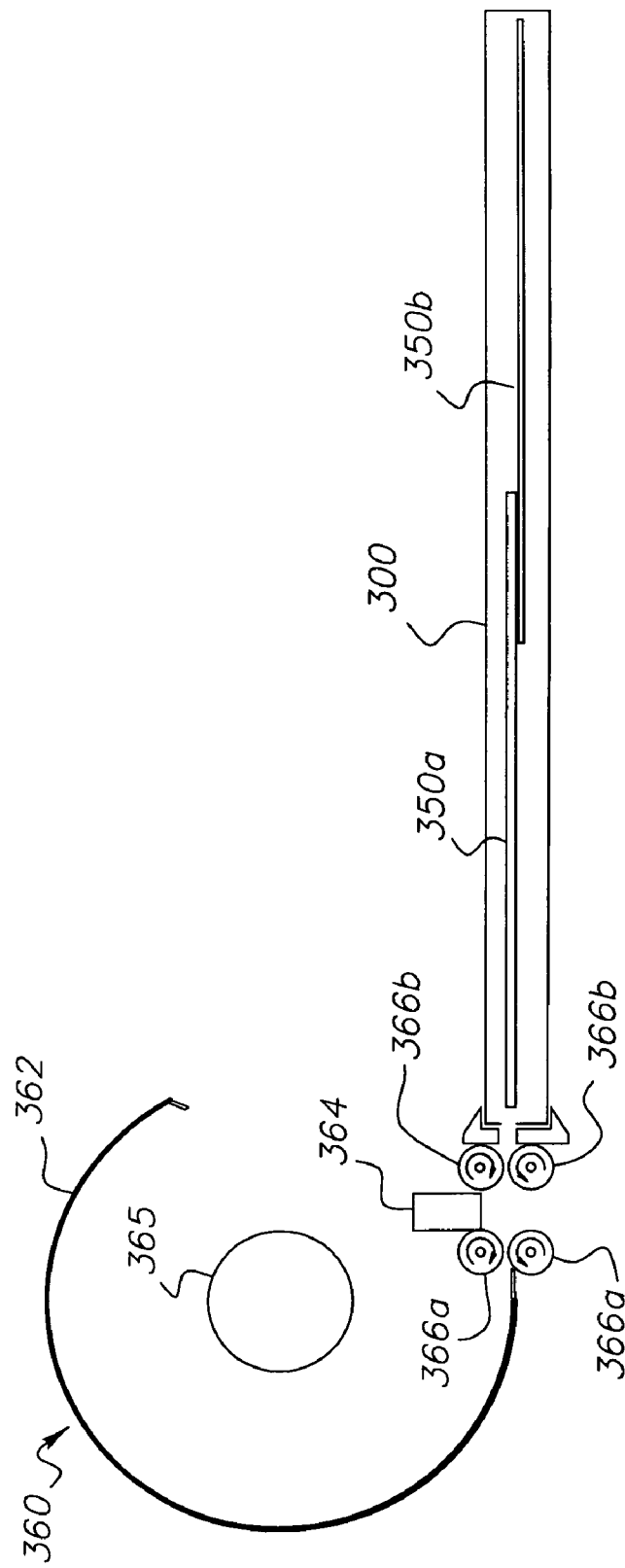

As shown in FIG. 3C, erasing lamps 364 are disposed between the pinch rollers. When the rollers are activated in a direction to guide the phosphor plate into the cassette, erasing lamps 364 are turned on to expose the plate to light as it passes underneath. As a result, plate 350a discharges its remaining stored energy before being inserted into the cassette for a subsequent exposure. The second phosphor plate 350b may then be loaded into the CR image reader and the process repeated to obtain a second partial image. After both partial images have been obtained, image processing algorithms may process the partial images to, for example, locate the reference marks, determine the extent of misalignment between the images, compensate for the misalignment, and stitch the two partial images together to form a single image of the elongate object.

Applicant has developed methods and apparatus for scanning and erasing a single extended length phosphor plate (such as shown in FIG. 2) in a CR image reader designed to operate with a scan length less than the length of the extended length phosphor plate. For example, in one embodiment, methods and apparatus for scanning and erasing an extended length phosphor plate in a CR image reader designed for standard large-sized plates are provided to facilitate scanning of elongate objects such as those encountered in various long bone examination procedures.

Figure 4A:
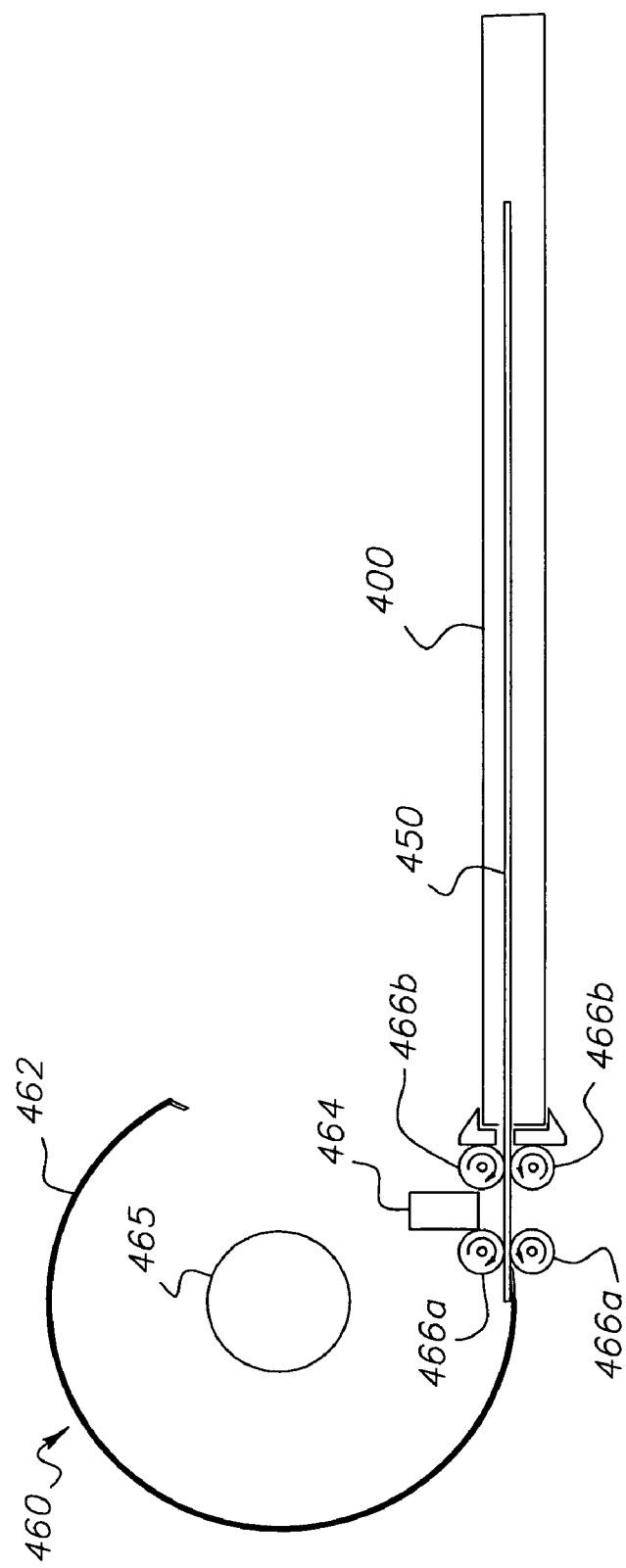
FIGS. 4A and 4B illustrate diagrammatic views of an exemplary scan and erase cycle of an extended length phosphor plate, in accordance with one embodiment of the present invention.
Figure 4B:
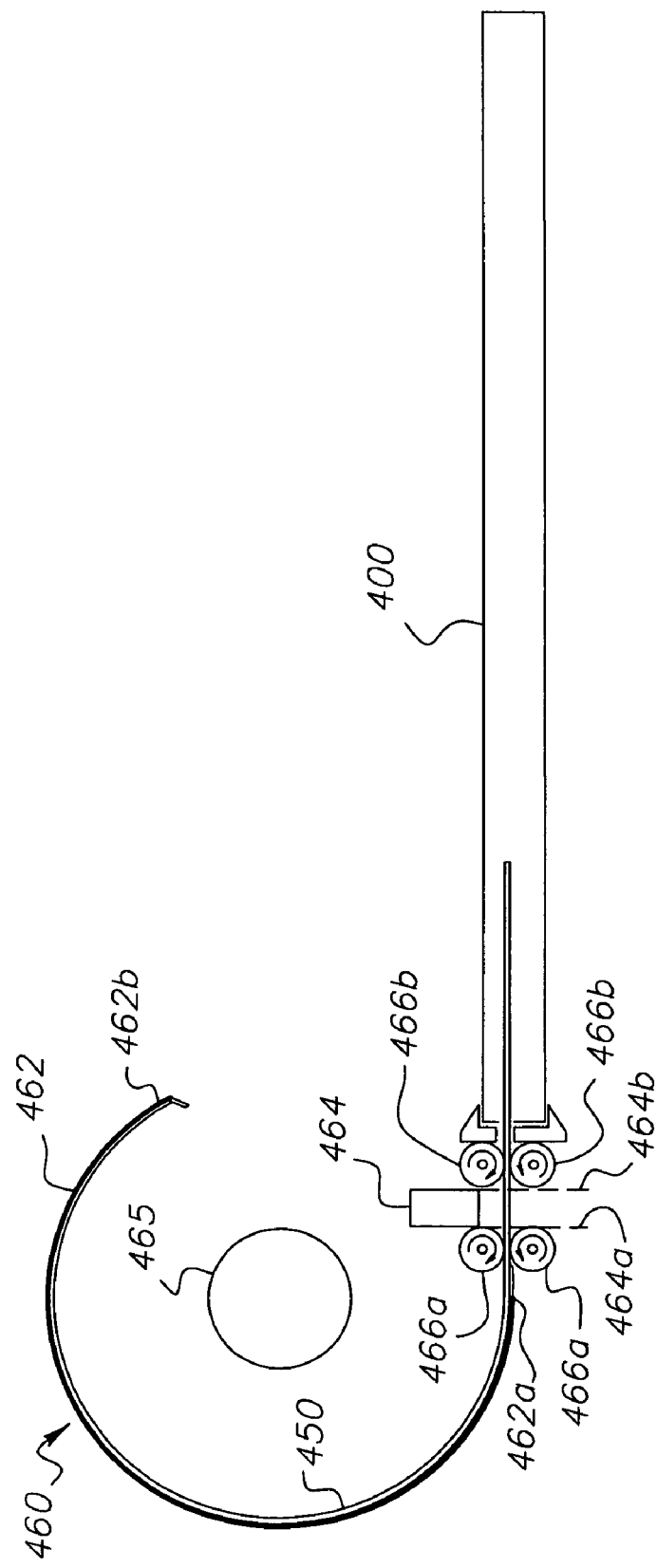

FIGS. 4A and 4B illustrate snapshots during an exemplary scan and erase cycle of an extended length phosphor plate, in accordance with one embodiment of the present invention.

FIG. 4A illustrates a cassette 400 for handling an extended length phosphor plate 450, inserted into CR image reader 460. CR image reader 460 may be structurally similar or substantially the same as CR image reader 360 illustrated in FIGS. 3A-3D. In particular, CR image reader 460 may have the same scan length as CR image reader 360.

FIG. 4B illustrates phosphor plate 450 fully inserted into CR image reader 460, such that it is in position for scanning by optical components 465. CR image reader than performs a scan of a portion of phosphor plate 450 by means of optical components 465 to obtain a first partial image of the elongate object. Rollers 466a and 466b may then reverse direction to guide phosphor plate back into cassette 400. Cassette 400 is then unloaded from the CR image reader and the other side is inserted into the CR image reader and the process is repeated to obtain a second partial image.

As discussed above, stitching of partial images from distinct imaging plates, as is done conventionally, often relies on redundant information available in an overlap region of the plates. According to aspects of the present invention, this redundant information may be obtained by scanning an over-scan region of the single extended phosphor plate multiple times. For example, a region of the plate 450 near the center may be scanned once during a first scan and again during a second scan. However, Applicant has appreciated that conventional erasing procedures (e.g., scan and erase cycles as described in connection with FIGS. 3A-3D) may erase information in the over-scan region before the second scan takes place, resulting in the loss of the information used, at least in part, to align and stitch the two partial images together.

Applicant has developed an erase timing schedule for extended length plates (such as shown in FIG. 2) that preserves information in the over-scan region without requiring additional erasing steps. This erase timing schedule is more particularly described with reference to FIGS. 5A-5F.

FIGS. 5A-5F illustrate a scan and erase process for an extended length plate in accordance with one embodiment of the present invention. For example, phosphor plate 550 may be scanned and erased by CR image reader 460 illustrated in FIGS. 4A and 4B.

Figure 5A:
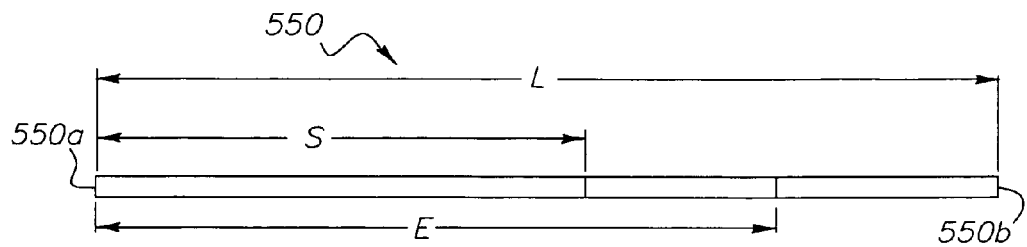
FIGS. 5A-5F illustrate diagrammatic views of a scan and erase process for an extended length plate, in accordance with one embodiment of the present invention.

FIG. 5A illustrates an extended phosphor plate 550 having a length L, for example, equal to or greater than a length of an elongate object to be imaged. Length S corresponds to the scan length of a CR image reader. Since the scan length of CR image reader 460 may be designed to accommodate and process standard sized plates in a single scan, length S may be significantly less than length L. For the combination of plate 550 and CR image reader 460, the scan length S is about half the length L plus an additional length o that contributes to the over-scan region, as discussed in further detail below.

Due to the width of the pinch rollers in a CR image reader (or other plate transport mechanisms) and due to the placement of the erasing lamps, CR image reader 460 is capable of erasing a larger portion of the plate in a scan and erase cycle than it is capable of scanning. For example, CR image reader includes a scan area that runs from approximately an end of cylindrical segment 462 (labeled as 462b in FIG. 4B) to approximately a beginning of cylindrical segment 462 (labeled as 462a in FIG. 4B). CR image reader also includes an erase area situated between the rollers, extending approximately between 464a and 464b (shown in FIG. 4B). When using an extended length plate (see FIG. 4B), there is a portion of the plate between the beginning of the scan area 462a and the end of the erase area 464b that is in a position to be erased if the lamps are turned on before or simultaneously with the reverse activation of the rollers. Because this portion of the plate is outside the scan area, it may be erased but not scanned during a first scan and erase cycle. Thus, the erase length E (shown in FIG. 5A) is longer than scan length S.

Figure 5B:
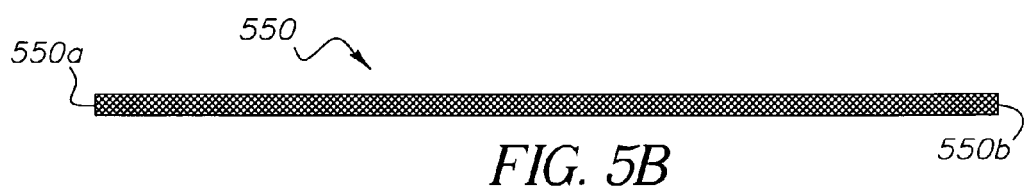
Figure 5C:

FIG. 5B illustrates plate 550 after it has been exposed to X-ray radiation, such that it stores a latent image of, for example, a long bone of a patient. Plate 550 may then be loaded into the CR image reader, with end 550a inserted first, and scanned to obtain a first partial image. As indicated by shading in FIG. 5C, portion 552 of phosphor plate 550 has been scanned and a portion of its stored energy released and detected to form the first partial image. Portion 554 of plate 550 has not been scanned and thus retains all of its exposure energy. It should be appreciated that scanned portion 552 includes an area over half the length of phosphor plate 550, allowing for an over-scan region to be scanned on both the first and second scan cycles.

To avoid erasing information in the over-scan region, the rollers may be activated to guide the plate out of the scan area in a reverse direction for a predetermined interval of time before the erasing lamps are turned on. The interval of time between the instant the plate begins moving in a direction towards the cassette and the instant the erasing lamps are activated is referred to as the "wait interval." The wait interval preserves the information in at least the over-scan region as it passes through the erase zone and into the cassette. Once the wait interval has expired, the erasing lamps are activated and the remainder of portion 552 is erased.

Figure 5D:
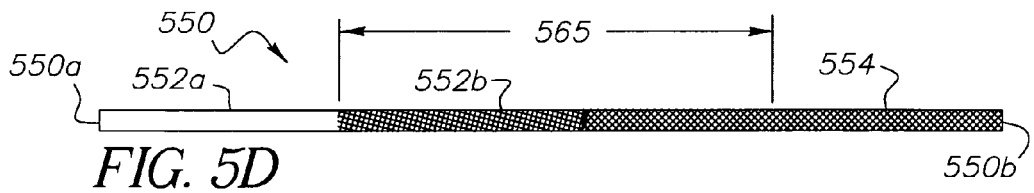

FIG. 5D illustrates phosphor plate 550 after the first scan and erase cycle. The wait interval includes the time necessary for portion 565 of phosphor plate 550 to pass through the erase zone of the CR image reader, including portion 552a of scanned portion 552. After the wait interval, the erasing lamps are activated to erase the remaining information in portion 552b. Although the exemplary wait interval in the embodiment shown in FIGS. 5A-5F was chosen to erase substantially half of portion 552, aspects of the invention are not limited in this respect. Any wait interval may be chosen that preserves information in a desired portion of the phosphor plate.

After the first scan and erase cycle, phosphor plate 550 may then be loaded into the CR image reader with side 550b inserted first to obtain a second partial image. That is, the end of the phosphor plate including portion 554 may be loaded into the CR image reader. As before, pinch rollers (or some other transport mechanism) guides the phosphor plate into the image reader and a second scan is performed.

Figure 5E:
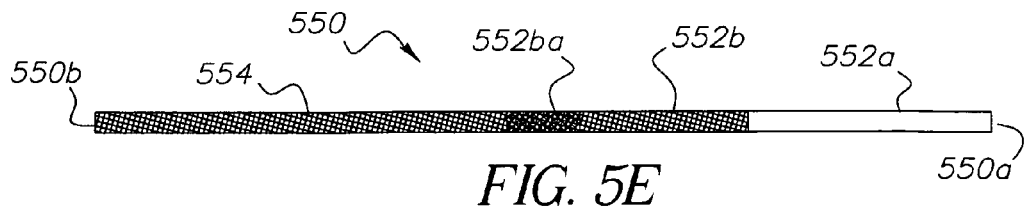

FIG. 5E illustrates phosphor plate 550 after a second scan cycle to obtain a second partial image. As with the first scan, more than half of the phosphor plate undergoes scanning from the optical scanning components of the CR image reader. Accordingly, all of portion 554 is scanned and an over-scan region 552*ba* of preserved scanned portion 552*a* undergoes a second scan cycle. The second scan cycle releases some of the energy in over-scan portion 552*a* left-over from the first scan to provide redundant information, as discussed in further detail below.

After the second scan cycle, the pinch rollers are activated in the reverse direction and the erasing lamps are turned on before or substantially at the same time as the rollers to erase the remaining length of the plate. Since the unerased portions 554, 552*ba* and 552*b* are contiguous and of a length less than length E, a full erase cycle is capable of removing all the remaining latent energy stored in the phosphor plate.

Figure 5F:
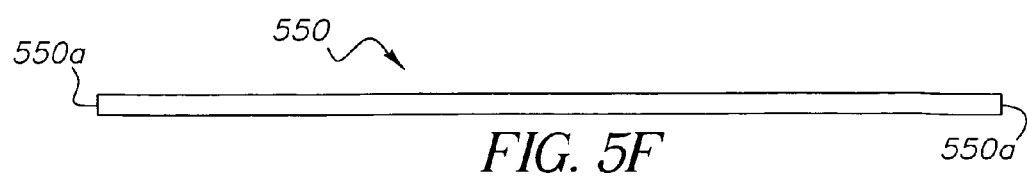

FIG. 5F illustrates phosphor plate 550 after the second scan and erase cycle, wherein the entire plate has been erased and is ready for a subsequent exposure to X-ray radiation.

It should be appreciated that the various portions illustrated in FIGS. 5A-5B are merely exemplary. Portion lengths and relationships to one another may vary depending on factors that may include any one or combination of the size and configuration of the CR image reader (e.g., the length of the erase zone, maximum scan length, maximum erase length, etc.), the length of the phosphor plate, a desired over-scan region, etc., and aspects of the invention are not limited for use with the relative dimensions illustrated in the embodiments described herein.

In general, when an exposed phosphor plate undergoes scanning, for example, by directing a laser beam to impinge on the surface of the phosphor plate, not all of the energy stored in the phosphor lattice is released. For example, scanned portion 552*b* retains an attenuated form of the image information stored during exposure. Accordingly, when over-scan region 552*ba* undergoes a second scan cycle, CR image reader will obtain an attenuated copy of the image information obtained from this region during the first scan cycle. The image information in the over-scan region obtained during the first and second scan cycle may then be matched up in order to align and stitch the partial images together.

As discussed above, in conventional long bone imaging, the "redundant" information is obtained by overlapping the two phosphor plates in the cassette. However, due to the absorption characteristics of phosphor plates, relatively little information is available on the phosphor plate situated underneath in the overlap region. Accordingly, conventional stitching techniques may rely on reference marks and may need to employ reference patterns outside of the overlap region, resulting in further obstruction to the content of interest (i.e., the medical image content). Moreover, in imaging procedures where the extended length plate achieves the same coverage as a conventional procedure using more than two conventional plates, still only a single over-scan region may be necessary. Accordingly, multiple overlap regions and stitching operations required in combining partial images from more than two conventionally dimensioned plates may be avoided.

In some embodiments, the redundant information in the over-scan region is sufficient to align and stitch the partial images into a single image without the aid of reference marks. That is, the information in the two copies of the over-scan region (i.e., the initial and attenuated copies) may be matched and aligned without having to rely on externally produced reference marks.

For example, in the first partial image acquired during the first scan, the ending edge is recorded by the last image pixel line. Subsequently, in the second partial image acquired during the second scan, the ending edge of the first partial image is recorded in the second partial image. Accordingly, the ending edge of the first partial image can be detected within/from the second partial image. If it is desired to stitch the second partial image to the first partial image, it may be necessary to rotate/position the second partial image so that it can be stitched along the ending edge of the first partial image.

Detection of the ending edge of the first partial image within the second partial image can be accomplished by detecting the signal discontinuity. That is, since the signal in the over-lap region is read in the first scan, its pixel intensity is reduced. This ending edge determines the relative position and rotation of the second partial image relative to the first partial image.

It is possible that the second partial image may need to be rotated based on the detected ending edge of the first partial image from the second partial image.

Further, the second partial image may need to be rotated by 180 degrees (prior to stitching it to the first image) so as to properly match the two images. This is due to the single imaging plate. That is, if each end of the single imaging plate is inserted into the CR reader, then one partial image needs to be rotated by 180 degrees to properly match the two partial images.

With regard to stitching the two partial images, commonly assigned U.S. Pat. No. 6,895,106 (Wang) discloses the use of information in the overlap region and/or scan ending edges for image stitching. It is noted that the stitching can be accomplished manually or automatically.

The present invention provides for the use of simpler cassettes that do not require built in patterns or marks to imprint the partial images, or alternatively, may permit the use of simpler reference marks and/or reference marks limited in location to the over scan region. In addition, in the absence of reference marks (or in the presence of relatively simple reference marks) more of the content of interest in the image is free from super positional interference of reference information that is not clinically useful and detracts from the medical examination and/or diagnosis.

It should be appreciated that while aspects of the invention may facilitate the use of simpler reference marks or their elimination altogether, any type of reference marks or fiducial technique may be used and is not limited in this respect. For example, it may be desirable to employ the same reference marks and alignment algorithms developed for multi-plate procedures in extended plate procedures to reduce further development costs.

As discussed above, in conventional elongate object scanning operations, misalignment between partial images obtained from the separate imaging plates may be caused, in part, by rotation of the plates with respect to the direction in which the plate is guided into the image reader. For example, as the pinch rollers in FIGS. 3A-3D guide the individual standard-sized plates into the CR image reader, the plates may tend to deviate from the intended path by differing amounts. Large deviations make stitching more difficult and result in relatively significant distortion in the image due to image processing techniques employed to correct the alignment errors. The extended length of the phosphor plates of the present invention helps to stabilize the plate as it is guided into the CR image reader to reduce the amount of possible rotation. In particular, since a portion of the extended phosphor plate remains in the cassette as the plate is guided into the CR image reader, and during scanning (see FIG. 4B) the cassette constrains the plate and limits its rotation and deviation from its intended scanning position. The reduction in alignment errors results in simpler stitching and less distortion in the resulting images.

It should be appreciated that various aspects of the invention may be used in connection with imaging not only of elongate objects in medical or industrial settings, but may be used in any circumstance wherein conventionally dimensioned phosphor plates are insufficient to provide coverage for an elongate object of which image information is sought.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed function. The one or more controller can be implemented in numerous ways, such as with dedicated hardware, or with general purpose hardware (e.g., one or more processor) that is programmed using microcode or software to perform the functions recited above.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. The invention is capable of other embodiments and of being practiced or of being carried out in various ways. In particular, single extended phosphor plates may used in connection with a variety of different cassettes and CR image readers and are not limited to the exemplary equipment illustrated herein. In addition, scan and erase cycles may be timed according to size and configuration constraints or any CR image reader. Accordingly, the foregoing description and drawings are by way of example only.

The phraseology and terminology used herein is for the purpose of description and should not be regarded as limiting. The use of "including," "comprising," or "having," "containing", "involving", and variations thereof herein, is meant to encompass the items listed thereafter and equivalents thereof as well as additional items.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

The invention claimed is:

1. A method of reconstructing a radiation image of an elongated object, comprising the steps of:
   extracting a first portion of a single storage phosphor plate of length L disposed within a cassette through a first end of the cassette, the first portion having a length S1 wherein $S1<L$;
   scanning the first portion to read storage information on the first portion to obtain a first partial image;
   erasing the stored information on a first segment of the first portion, the first segment having a length E1 wherein $E1<S1$;
   extracting a second portion of the single storage phosphor plate through a second end of the cassette, the second end opposing the first end, the second portion having a length S2 wherein $S2<L$ and $S1+S2>L$;
   scanning the second portion to read storage information on the second portion to obtain a second partial image; and
   erasing the remaining stored information stored on the storage phosphor plate.

2. A method of claim 1, wherein the step of erasing the remaining stored information is accomplished by erasing at least a length E2 of the storage phosphor plate, wherein $E2=L-E1$.

3. The method of claim 1, further comprising the steps of:
   identifying, in the first partial image, an ending edge recorded by a last image pixel line, the ending edge identified in the first partial image being a first marker;
   detecting, in the second partial image, the ending edge, the ending edge detected in the second partial image being a second reference; and
   combining the first and second partial images by aligning the first and second references.

4. The method of claim 3, wherein the step of combining is accomplished by rotating the second partial image relative to the first partial image to align the first and second references.

5. The method of claim 3, wherein the step of detecting the ending edge in the second partial image is accomplished by detecting signal discontinuity.

* * * * *